United States Patent Office 3,171,764
Patented Mar. 2, 1965

3,171,764
SOLID PROPELLANT
Theodore C. Parker, Sunnyvale, and William H. Colburn, Jr., Irvington, Calif., assignors to General Precision, Inc., a corporation of Delaware
No Drawing. Filed Mar. 22, 1962, Ser. No. 181,794
4 Claims. (Cl. 149—19)

This invention relates to solid propellants for rockets and the like.

In solid propellants it is necessary to provide a fuel such as aluminum and an oxidizer such as potassium perchlorate. It is customary to enclose such a propellant in a very substantial metal casing which, of course, adds to the dead weight of the rocket propelled by the propellant. Also it is necessary to provide a nozzle or restricted orifice for the following reasons: It is a characteristic of a solid propellant, as provided heretofore, that its burning rate increases exponentially with pressure. To be effective as a propellant, i.e., to burn at a sufficiently rapid rate to be an effective propellant, pressure must be maintained at a very high figure. This is accomplished by employing a nozzle or restricted orifice which builds up a substantial back pressure.

Solid propellants available heretofore have had very little structural strength and, as stated, they have required the use of a strong housing or casing. The need also to provide a nozzle or restricted orifice aggravates the requirement of a substantial housing.

It is an object of the present invention to provide improvements in the art of solid propellants.

It is a further and more particular object of the invention to provide a solid propellant which is characterized by substantial mechanical strength, such that it can be used without a housing, or with a housing which is of light weight, combustible material and which undergoes combustion and dissipation as the propellant burns.

Yet another object of the invention is to provide a propellant whose burning rate-pressure characteristic is such that it will burn at an adequately high rate to function as an efficient propellant without the need to use a nozzle or restricted orifice.

The above and other objects of the invention will be apparent from the ensuing description and the appended claims.

In accordance with the present invention a mixture of finely divided solid fuel and finely divided solid oxidizer is formed. In this mixture is included, or to it is added a finely divided thermosetting or catalytically setting resin or polymer to function as a binder. Such binder will be referred to hereinafter as a resin, which as stated, may be thermosetting or catalytically setting. The mixture is formed so that there is a very intimate admixture of all three of these ingredients, i.e., (1) the solid fuel, (2) the solid oxidizer and (3) the resin.

By "catalytically setting" is meant resins which are cold setting (i.e., which set at room temperature) and resins which set at an elevated temperature, but which require the action of an added catalyst to cause setting or curing of the resin.

The resin, like the fuel and the oxidizer, is solid, and it has certain important characteristics. Thus the resin is one which does not melt or soften greatly at low temperatures; it is thermosetting or catalytically setting; and it is partially polymerized to a point such that it is capable of further polymerization or curing but also of softening or incipient infusion upon the application of heat before it sets or cures to a rigid mass.

This mixture of fuel, oxidizer and resin is subjected to pressure sufficient to consolidate the mass and to increase substantially its density. It is also subjected to curing (as by the action of a catalyst, of heat or of heat and a catalyst) to bring about curing. The application of pressure and the curing step may be carried out simultaneously, or the curing step may follow the pressure step. If the resin is a catalytically setting resin to which a catalyst must be added, the catalyst is added to the mixture either along with the resin, or separately at the time it is desired to form the final product.

It is important that the resin soften or fuse sufficiently to become tacky and to bond to the particles of solid fuel or solid oxidizer. Otherwise a product of inferior quality is produced, e.g., a product which has poor mechanical strength and which has inferior properties otherwise as a propellant. It is also important that the resin not become highly fluid upon the application of heat and pressure because the resulting fluid will envelope and seal the particles of fuel and oxidizer, which is undesirable and which will degrade the propellant properties.

It is preferred to select a resin having the following characteristics:

(1) It is solid at temperatures up to about 130° C. and it is in the form of very small solid particles, preferably smaller than 325 mesh, which can be air floated.

(2) It is fusible or capable of softening upon the application of heat without, however, becoming liquid, at temperatures of about 130° to 160° C., such fusion or softening being sufficient to render the particles of resin tacky and causing them to adhere to one another and to the particles of fuel and oxidizer.

(3) The resin should be one which further sets, polymerizes or cures by a thermal effect and/or by a catalytic effect to a degree such that the cured resin will not liquefy or fuse when heat is applied again, as when the product is ignited. If a catalyst is used, it should be a solid catalyst. By this means a propellant is produced having the following advantageous characteristics:

(a) It is nonairbreathing; that is to say, it includes fuel and oxidizer, the resin itself constituting a part of the fuel although the principal fuel is an ingredient other than the resin. The resin also produces gas upon combustion and therefore provides the gas necessary to impart thrust.

(b) The principal fuel and the oxidizer are in the form of separate, discrete particles which are in intimate admixture.

(c) The particles of principal fuel and oxidizer are bonded together by a more or less continuous phase formed by curing the resin, such phase being continuous in the sense that it is bonded to the principal fuel particles and the oxidizer particles and is within itself an essentially continuous phase.

(d) This binder phase (the cured resin) is not, however, in the form of the usual continuous phase binder which completely envelopes and seals the individual particles which it binds together. Instead the binder of the present invention provides what we believe to be a honeycomb, cellular or matrix-like phase which performs the important mechanical function of holding the fuel and oxidizer particles together in a rugged, mechanically strong form but which permits free communication of thermal energy and pressure between the fuel and oxidizer particles when the mass is ignited.

Examples of suitable fuels for purposes of the present invention are aluminum, boron, carbon and magnesium, also mixtures and alloys of these with one another and/or with other elements. The preferred fuels are aluminum and boron, aluminum being the most advantageous fuel. The fuel is preferably smaller than 325 mesh.

Examples of suitable oxidizers are potassium perchlorate, potassium bromate, ammonium perchlorate, ammonium nitrate and molybdenum trioxide. Mixtures of such oxidizers may be employed. The preferred oxidizer is potassium perchlorate. Preferably the oxidizer is employed in a size range of about 150 to 350 mesh.

Examples of suitable resins are solid epoxy, solid phenol-formaldehyde, solid urea-formaldehyde and solid melamine resins. Mixtures of such resins may be employed. These are catalytically setting, cold-setting or thermosetting resins all of which, for purposes of the present invention, are used in finely divided solid form, preferably about 2 to 4 microns. They are partially polymerized to the point that they are solid, preferably not melting or fusing below about 130° C. Thermosetting resins, of course, will become harder on heating, i.e., they will not melt as will epoxy resins but, for purposes of the present invention, they will soften and undergo incipient fusion at elevated temperatures before undergoing further substantial polymerization and hardening.

The preferred resins are solid epoxy resins which melt at temperatures not less than about 140° to 160° C., and which are capable of curing by application of heat (in the presence of a catalyst added to the resin) to a hard, infusible resin. A suitable epoxy resin is that known as Shell Epon 1009 (Epon being a trademark of Shell Chemical Co. for epoxy resins). Shell Epon 1009 is a copolymer of propylene oxide and bisphenol; i.e., it melts at 145–155° C.; it has a color at 25° C. on the Gardner scale of 5 max.; it has a viscosity of $Z_2$–$Z_5$ on the Gardner-Holdt scale and of 38–100 poises on the absolute scale; and it has an epoxide equivalent (grams of resin containing one gram equivalent of epoxide) of 2500–4000. It is described in Shell Chemical Co.'s Technical Bulletin SC:60-43. Epon 1009 has the following structural formula

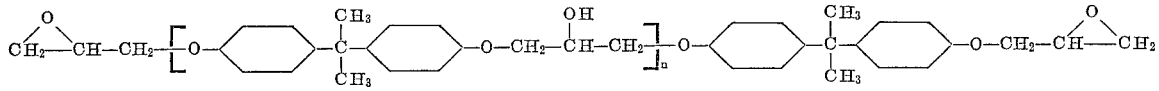

wherein $n$ indicates the number of repetitive units. A suitable catalyst or curing agent is dicyandiamide in the amount of about 5% of the weight of epoxide.

Another very similar epoxide that has been used is Armstrong Epoxy Resin E-301-14, which is a product of Armstrong Products Company of Warsaw, Indiana.

120° C. to 260° C. and pressures of about 5000 to 25,000 p.s.i.

By this means a consolidated, exceptionally rugged cartridge or shape is produced which can be initiated by suitable means, as by means of a charge of explosive, or by an exploding bridgewire. When initiated it will burn at a very rapid rate and will serve as an excellent propellant for rockets and the like.

The following specific examples will serve further to illustrate the practice and advantages of the invention:

*Example 1.*—A mixture of 76 parts by weight of potassium perchlorate, 9.5 parts by weight of powdered aluminum and 14.5 parts by weight of Armstrong Epoxy Resin E-301-14 was prepared. (This is very similar to Shell's Epon 1009 and it has the structure and terminal groups described above. A curing catalyst is present in the resin as supplied by the manufacturer.) The potassium perchlorate was 256 mesh. The aluminum was pyrotechnic grade flaked aluminum of about —325 mesh. The epoxy resin was about 60% 3 to 10 microns, 30% 10 to 30 microns and 10% 30 to 50 microns and had substantially the same properties as the Shell Epon 1009 described above. This mixture of ingredients had a theoretical specific gravity of 2.2 to 2.4. As a free-flowing powder it had a specific gravity of 0.6. Its tapped specific gravity was 0.9. The mixture was agitated thoroughly, then placed in a sturdy tube and subjected to the pressure of a ram at 15,000 p.s.i. at a temperature of 350° F. By this means rods or slugs ½ inch long and ½ inch in diameter were formed which had a very high tensile strength, above 1800 lbs. per square inch.

*Example 2.*—Mixtures were prepared from the same materials as used in Example 1 employing, however, different proportions to determine their effect on heat of combustion. The theoretical heat of combustion was calculated for each mixture and the actual heat of combustion was measured in a calorimeter. The results are set forth in Table I below. Heat quantities are calories per gram.

*Table I*

|  |  | Theoretical Heat of Combustion | Actual Heat of Combustion | Heat Loss | Percent Loss |
|---|---|---|---|---|---|
| Mix No. 1 | 75% KClO₄, 10% Al, 15% epoxy resin. | 1,567 | 1,455 | 112 | 7.1 |
| Mix No. 2 | 77.3% KClO₄, 9.9% Al, 12.8% epoxy resin. | 1,767 | 1,635 | 132 | 7.5 |
| Mix No. 3 | 80.8% KClO₄, 7.6% Al, 11.6% epoxy resin. | 2,017 | 1,566 | 451 | 22.2 |

Broad and preferred ranges of proportions components are as follows:

| Component | Broad Range | Preferred Range |
|---|---|---|
| Oxidizer | 100 parts by weight | 100 parts by weight. |
| Principal fuel | 5 to 20 parts by wt | 10 to 15 parts by wt. |
| Resin | 10 to 40 parts by wt | 15 to 25 parts by wt. |

A solid mixture thus prepared is placed in a suitable mold. Pressure is then applied sufficient to consolidate the material, and at a temperature sufficient to soften and bring about incipient fusion of the binder. If the resin is a cold-setting resin and requires the addition of a catalyst, such is added to the resin before it is subjected to heat and pressure. Frequently the catalyst required is incorporated by the manufacturer.

The usual curing conditions are temperatures of about

Among the various advantages of the propellant material of the present invention are the following: Rods compressed at 15,000 p.s.i. and at 350° F. have a specific gravity of 2.0 and exhibit an unusual tensile strength equal to about 1800 pounds per square inch. This enables the material to be used without a casing or with a very light casing which is combustible. This is advantageous because it makes possible the elimination of the dead weight of a heavy housing or casing. Therefore light weight rockets such as meterological or sounding rockets can carry a heavier pay load. Also, because the entire rocket is consumed (except for the pay load, which may be brought to ground by a parachute) the danger of damage in the impact area is greatly reduced.

The propellant of the present invention has an exceptionally high burning rate. This enables it to be employed as a rocket propellant without a nozzle or restricted orifice. Conventional propellants require the use of a restricted orifice or nozzle to produce sufficient back pressure for the propellant to burn at an adequate rate, but the propellant material of the present invention will burn in an unconfined form and without a nozzle or restricted orifice, at a sufficient rate to serve as very effective propellant material. Preferably the propellant of the present invention is enclosed in a light, combustible casing which projects beyond the rearward end of the propellant a slight extent, e.g., 5/8", to direct the combustion gases. Light gauge aluminum, steel and plastic casings are suitable. The propellant material of the present invention will burn from one face only (for example, from the end of a rod or cylinder) without spreading along the side walls or into the interior. Also the rate of burning increases with the energy of initiation as shown by dent tests in which 260 mg. pellets were initiated, in one series with an exploding bridgewire exploded by a 2.0 kilovolt energy source and in another series with an exploding bridgewire exploded by a 2.5 kilovolt energy source. Conditions were otherwise identical. The results (in mils depth of dent) are set forth in Table II below:

Table II

| 2.0 KV Initiation | 2.5 KV Initiation |
|---|---|
| 1.  0.023 | 1.  0.033 |
| 2.  0.024 | 2.  0.033 |
| 3.  0.017 | 3.  0.028 |
| 4.  0.022 | 4.  0.031 |
| Avg.=0.0215 | 5.  0.034 |
|  | Avg.=0.0318 |

Another marked advantage of the propellant of the present invention is its high degree of temperature stability. Thus it is dependable, controllable and operable down to −100° F., whereas the best solid propellants known to us heretofore have been dependable only down to about −75° F. Another desirable property resides in the fact that the rate of burning does not increase with pressure nearly as rapidly as with other solid propellants. Other solid propellants have an exponential increase of burning with pressure expressed by the following equation:

(1) $$r = k(p^m)^n$$

The equation for the preferred propellant of the present invention is as follows:

(2) $$r = kp^{0.834}$$

That is to say, the rate of burning of the propellant of the present invention does not increase with pressure nearly to the degree of other solid propellants. Therefore, there is much less likelihood of explosion due to pressure build-up in a rocket or missile.

It will be understood that the maximum benefits described hereinabove pertain to the preferred embodiments of the invention, particularly to mixtures of aluminum, potassium perchlorate and solid epoxy resin the same as or similar to that of Example 1. However, some or all of these benefits exist and apply to a substantial degree in the case of all the propellants of the present invention.

The propellants of the present invention may be initiated in various ways. For example, they can be initiated by an exploding bridgewire or by a charge of explosive material such as RDX which itself may be initiated by an exploding bridgewire. The propellant of the present invention tends to be somewhat sensitive to stray current in an exploding bridgewire system. Therefore use is not ordinarily recommended in contact with a bridgewire if there is likelihood of stray currents.

The composition of the present invention has been described principally as a propellant, but is has other uses, e.g., as an explosive and as a means of developing quickly a volume of gas under high pressure to perform an auxiliary operation in a rocket or missile, e.g., to drive a piston which operates a blade to sever a bolt or other connector to separate a part of a rocket.

It will, therefore, be apparent that a novel and very useful and exceptional type of solid propellant material has been provided.

We claim:

1. A propellant composition consisting essentially of aluminum, potassium perchlorate and an epoxy resin, said composition and ingredients having the following characteristics:
   (a) the aluminum is in finely divided form,
   (b) the potassium perchlorate is in finely divided form,
   (c) the aluminum and potassium perchlorate are intimately mixed together,
   (d) the epoxy resin is in the cured state,
   (e) the aluminum and potassium perchlorate are present in proportions to form a propellant mixture,
   (f) the epoxy resin is present in quantity sufficient to act to bind the particles of aluminum and potassium perchlorate together and to form a continuous solid phase interconnecting the aluminum particles and the potassium perchlorate particles without sealing the individual particles from one another.

2. The composition of claim 1 wherein said ingredients are present in approximately the following proportions by weight:

| | |
|---|---|
| Potassium perchlorate | 100 |
| Aluminum | 10–15 |
| Epoxy resin | 15–25 |

3. In the method of producing a solid propellant by forming a mixture of a finely divided solid fuel, a finely divided solid oxidizer and an organic binder and treating the mixture to cause the binder to form a binder medium which holds together the fuel and oxidizer particles as a solid, form-substaining mass, the improvement which comprises: providing finely divided aluminum and finely divided potassium perchlorate as the fuel and oxidizer, respectively; providing the binder in the form of solid, finely divided epoxy resin in the uncured state and containing a curing agent; forming an intimate mixture of the aforesaid aluminum, potassium perchlorate and epoxy resin; then applying heat and pressure sufficient to form a consolidated mass and to cure the resin; whereby a solid composition is produced wherein the epoxy resin serves as a solid phase binder which binds together particles of aluminum and potassium perchlorate without sealing the individual particles of aluminum and potassium perchlorate and isolating them from one another.

4. The method of claim 3 wherein said ingredients are present in approximately the following proportions by weight:

| | |
|---|---|
| Potassium perchlorate | 100 |
| Aluminum | 10–15 |
| Epoxy resin | 15–25 |

References Cited in the file of this patent

UNITED STATES PATENTS

| 2,622,277 | Bonell et al. | Dec. 23, 1952 |
| 2,857,258 | Thomas | Oct. 21, 1958 |
| 3,014,796 | Long et al. | Dec. 26, 1961 |

OTHER REFERENCES

Zaehringer: "Solid Propellant Rockets," American Rocket Co., Box 1112, Wyandotte, Mich. (1958), pages 203–219.

Chemical Engineering, April 21, 1958, pages 126–129.

Missile Design and Development, vol. 6, September 1960, pages 24–26 (copies of non-patent references in Scientific Library).